Aug. 7, 1962     A. M. CONWAY     3,047,957

STERNOCLAVICULAR JOINT MEASURING INSTRUMENT

Filed Dec. 4, 1958

Anna M. Conway
INVENTOR.

BY *Clarence A. O'Brien*
*and Harvey B. Jackson*
Attorneys

United States Patent Office 3,047,957
Patented Aug. 7, 1962

3,047,957
STERNOCLAVICULAR JOINT MEASURING
INSTRUMENT
Anna M. Conway, Janesville, Wis.
(455 S. Park Ave., Webster Grove, Mo.)
Filed Dec. 4, 1958, Ser. No. 778,236
2 Claims. (Cl. 33—174)

The present invention relates to a special purpose instrument which is expressly constructed and designed that it enables a user thereof to use the same in a manner which provides needed measurements and information for preparing a chart for a live patient or recently deceased individual.

More particularly the instrument is such in construction and adaptability that measurements for significant range movements in the sternoclavicular joints are ascertainable.

Investigators specializing in the field of endeavor under advisement are generally in agreement that there exists a need for a practical instrument, apparatus or device the use of which will simplify the steps necessary in following an accurate method of joint measuring. An acceptable solution of the problem may be effectually reached through proper use of the instrument herein disclosed. That is to say a qualified user, the investigator, of the instrument may carry out a simplified method which results in measuring relative ranges of movement in three planes simultaneously in any joint, but, more particularly, the aforementioned sternoclavicular joint.

The currently prevailing method of measuring the movements in a sternoclavicular joint involves the use of a gonimeter which, as is known, is a protractor in modified form, but is capable of measuring changes in only one plane at a time. Another procedure involves the use of X-rays but the latter procedure appears to be less practical and acceptable especially in view of recent findings on X-ray damage.

In carrying out the inventive ideas herein under consideration a highly simple, reliable, easy-to-use structural device has been evolved, produced and used. Primarily the use of the device in connection with sternoclavicular joint movements and measurements has been in two planes; namely, coronal and horizontal. Actually, however, it is within the scope of the concept to provide reference media involving a third plane but to an extent this "third plane" aspect may be regarded as lacking validity because of the skin moving on the body resulting in a distorted and sometimes inaccurate viewing of the exact movement of the clavicle rotating around a long axis passing through the length of the bone. Perhaps a more accurate landmark on the body of the patient may have to be reckoned with.

Experimental procedural use of the invention shows that it is feasible to use the same in conjunction with a chart (not shown) and which has to do with both right and left sides of the subject. The chart can be laid out and prepared to enable a user of the instrument to write in significant information and measurements which may be oriented from a starting position the findings or information making it possible to show the results of an increase in angle from a starting position or a decrease in an angle from a starting position. Other factors having to do with elevation, depression, protraction, retraction, upward and downward rotation of the glenoid fossae may be taken into account as data and information necessary in providing a readable reference chart having to do with changes in movement indicative of deviations from the place of orientation, that is, the aforementioned starting point.

Briefly summarized, a preferred embodiment of the invention is that depicted in the drawing and which is characterized by a substantially rectangular transparent plastic or equivalent block. The block provides a base which may be caught hold of and held in the intended starting position. The base is provided with a clearly visible level. In addition it is equipped at the top with ball and socket means providing an operating connection or joint between the base and an outstanding lever arm. The arm constitutes a variable indicator and is employed for use in conjunction with graduations on a scale in a manner to provide measurable movement data for chart use.

The ball and socket joint features a socket member which is in the form of a permanent magnet. The ball is of magnetizable material and it, in turn, has a screw threaded socket to accommodate a screw threaded inner or proximal end portion of an angle denoting or indicating lever.

In addition the invention features a movable collar which rests atop the base and encircles the socket member or magnet.

The scale-equipped ring or collar which assumes a horizontal rotatable position has the additional function of supporting upstanding or vertically disposed horseshoe-shaped frame which is graduated to provide the needed scale information for cooperation of the adjacent portion of the lever or lever arm therewith.

Other objects, features and advantages will become more readily apparent from the following description and the accompanying drawing.

In the drawing, wherein like numerals are employed to designate like parts throughout the views.

Figure 2:
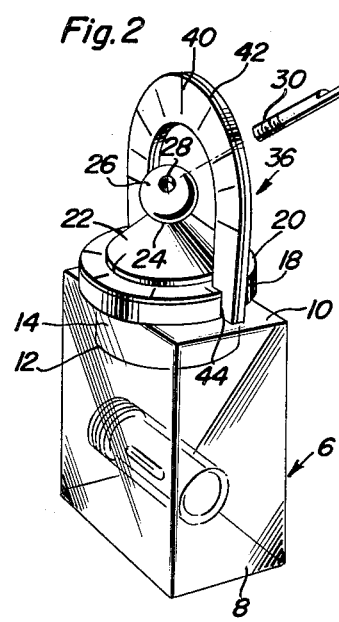
FIG. 2 is a perspective view with the rod-like arm or lever detached.

Referring now to the views of the drawing and with particular attention on FIG. 2 the aforementioned block-type base is denoted by the numeral 6. It is constructed from clear commercial plastics of desired rigidity and quality. The experimental models in use show the block to be some two inches high and approximately one inch thick. It may also be approximately two inches wide. In fact one might visualize the instrument as about the size depicted in FIG. 2.

Figure 1:
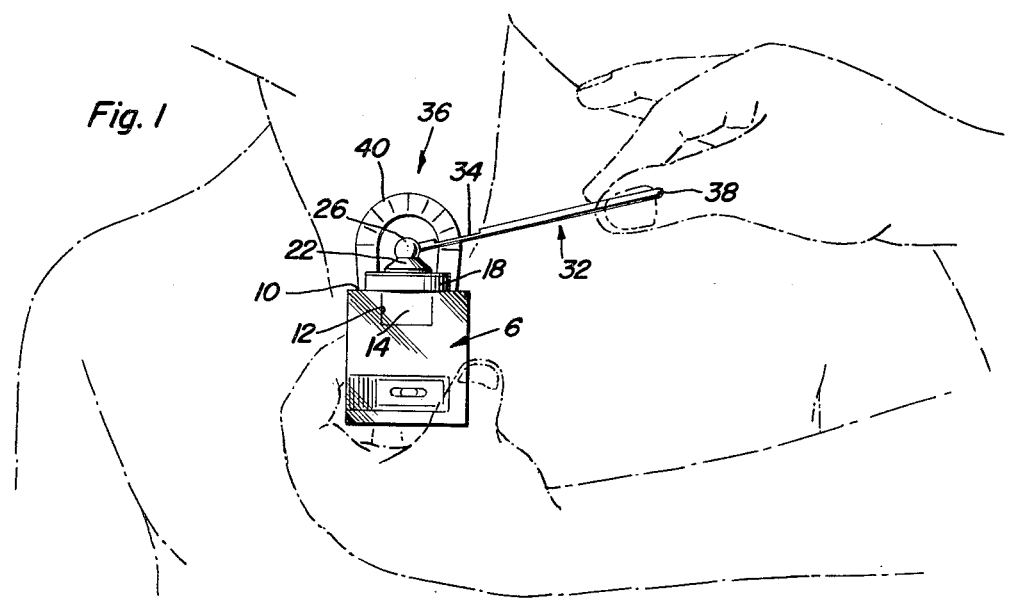
FIG. 1 is a view in front elevation of a sternoclavicular joint measuring device or instrument constructed in accordance with the principles of the invention and showing the manner in which the same is preferably held and used.

The front, back and side surfaces are smooth and flat. The bottom is flat as at 8 and the top flat at 10. Opening through the center of the top is a relatively shallow socket 12 in which the lower portion 14 of a cylindrical permanent magnet is fitted and secured. The upper portion 16 protrudes a specified distance above the plane of the top 10 and provides an axial hub for a freely rotatable collar or ring 18. This ring is provided on its top with with an annular suitably graduated measuring dial 20. The portion of the plug or magnet above the plane of the dial 20 is of truncated conical form, as at 22 and the apical end 24 is recessed to provide the "socket" of a ball and socket joint. The ball is denoted at 26 and is constructed of steel or an equivalent magnetizable material. It is of a diameter to seat well but movably in the recess or socket 24. The ball in turn is provided at one side with a screw threaded socket 28 to accommodate the inner proximal end 30 of the indicating rod or lever 32. This part 32 is sometimes referred to as a lever arm. In any event it is a rod of requisite cross-section having a clearance notch 34 which bridges and accommodates the component portions of the vertical horseshoe-shaped frame 36. The lever 32 is, manifestly, of prescribed length so that the outer or distal end 38 may be held between the user's fingers in the manner shown in phantom lines in FIG. 1. It may be pointed out here that the screw threads in the socket 28 and on the proximal end portion 30 of the indicating rod or lever may be of prescribed pitch so that this screw threaded joint between the ball and rod may be employed as a reference point as it is advanced into the socket or screwed out of the socket as the case may be. The area is so small that a dial cannot be placed on the ball but it is within the purview of the invention to utilize a suitable marker such as is sometimes used on and in connection with a micrometer.

Figure 3:
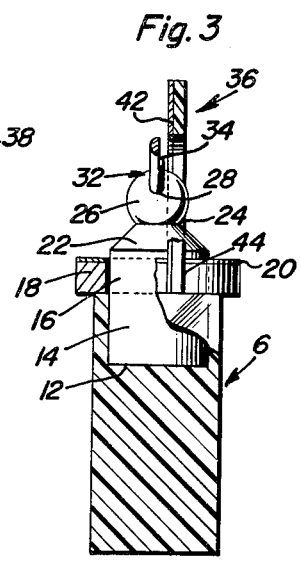
FIG. 3 is a central vertical view with parts in section and elevation detailing the construction and relationship of the components or parts which go to make up the complete instrument.

Briefly reviewing the disclosure it will be evident that the invention is characterized by a base in which a magnet is inserted and a level embedded. The magnet holds a ball from which a lever arm extends. The graduations 40 (FIG. 2) on the dial 42 of the horseshoe-shaped frame 36 relate to findings for the coronal plane. The limbs or end portions of the frame 36 are assembled and held in keeper notches 44 provided therefor and it will be observed in FIGS. 2 and 3 that this frame 36 is offset, that is to the right of the center in FIG. 3 so that it occupies a proper perpendicular position for cooperation of the lever arm 32 therewith. The level in the base is obviously used as an indicator showing that the base is being held or kept at a given starting position as the lever arm 32 is caused to move. The center of the ball approaches as closely as possible the axis of the joint. The lever arm is kept in contact with the medial part of the clavicle throughout the movements. The graduations are there to facilitate reading the angles of movement directly.

The subject is asked to sit with back straight, arms in resting position at side. The instrument is placed with the center of the ball as closely associated with center of the sternoclavicular joint as possible, FIG. 1. The lever arm 32 is kept in contact with the medial part of the clavicle throughout the movement. The level is leveled. The normal position is recorded in the two planes of movement as the magnet holds the arm and the degrees can be read directly from the scales. After the starting position is recorded, the instrument is applied to the same point on the subject and the subject is instructed to perform the desired movement. It is further to be noted that in measuring the range of movement of the sternoclavicular joint the instrument must be oriented or held to assume a position in close apposition to the axis of the joint, this as close as possible for otherwise likelihood of error is proportionately magnified. Concerning the base, it is to be pointed out that the surface resting against the body must be substantially flat or plane. The other surfaces need be designed only so that a firm grasp may be had. Then, too, the base being of a suitable grade of commercial plastics is not only transparent but non-corrodible and subject to being kept as clean and sanitary as possible for individual use. In a construction of this type it is apparent that the means of recording the movement must be close to the joint and the preferred flat surface of an area to rest correctly on the thoracic wall. A desired reading is represented coincident with the movement of the lever arm as it is held in close proximity to and follows the movements of the clavicle.

Extended study work is being undertaken by this applicant concerning forensic medicine in which movement, rigor and so on might conceivably be used as an indicator of the length of time since death. Therefore, the subjects or bodies used here are not necessarily "patients" but would also include deceased individuals.

To explain the idea of the third plane of movement not being recorded at present time: the clavicle (besides moving in a horizontal and a coronal plane) acts like a crankshaft turning about a long axis. The amount of this movement is limited and getting a reliable point from which to measure is not easy as the skin slips as the bone moves but not at the same rate. For the forensic studies, pins will be put into the clavicle and the exact rotation can be measured. But the prime purpose of developing this apparatus is for use on living people, the pin idea is not feasible in every case. Studies using pins have been done with prisoners, so the idea is not new.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A sternoclavicular joint measuring instrument comprising a transparent block-like base having a spirit level embodied therein and conveniently visible for use in holding the base at a given starting position, said base having a flat top surface, a permanent magnet plugged into the central top of said base with a portion projecting above said top surface and providing a hub and also having a truncated conical portion with an apical recess providing a socket, a magnetizable ball removably but adjustably mounted in said socket, said ball being provided in one side with a screw threaded socket, a rod having a screw threaded end screwed into said socket, said rod constituting an angle indicating and measuring lever, a first dial mounted for rotation about said hub, cooperable with said magnet, and provided with graduations which when read are indicative of movements in a horizontal plane, and a second dial carried by the first dial and disposed at right angles thereto and provided with graduations which are usable for recording a reading of degrees in a coronal plane, said first dial being cooperable with an index provided therefor on said base and said rod having a median portion thereof cooperable with the graduations provided therefor on said second dial.

2. A sternoclavicular joint measuring instrument comprising a transparent block-like base having a spirit level embodied therein and conveniently visible for use while holding the base at a given starting position, said base having a flat top surface parallel to the plane of the spiral level, a permanent magnet plugged into the central top of said base with a portion thereof projecting above said top surface and providing a hub and also having a truncated conical portion with an apical recess providing a socket, a magnetizable ball removably but adjustably mounted in said socket, said ball being provided in one side with a screw threaded socket, a collar supported on said top surface and encompassing said magnet and having a readily viewable graduated dial adapted to provide readings indicative of movements in a horizontal plane, the graduations on said collar being cooperable with a fixed index on said hub, a horse-shoe shaped frame having a bight portion arching over said magnetizable ball and limb portions engaging diametrically opposite portions of said collar, said frame having a surface graduated for cooperation with the first named graduations and usable for recording a reading of degrees in a coronal plane, and a straight rod having a screw-threaded end screwed into said socket, said rod constituting an angle indicating and measuring lever and being cooperable in particular with the graduations on said frame.

References Cited in the file of this patent

UNITED STATES PATENTS

| | | |
|---|---|---|
| 712,869 | Trerise | Nov. 4, 1902 |
| 2,275,036 | Schwartz | Mar. 3, 1942 |
| 2,380,236 | Harker | July 10, 1945 |
| 2,594,029 | Johnson | Apr. 22, 1952 |
| 2,615,248 | Hildebrandt | Oct. 28, 1952 |
| 2,632,952 | Mallow | Mar. 31, 1953 |
| 2,752,693 | Wullschleger | July 3, 1956 |
| 2,813,349 | Harris | Nov. 19, 1957 |
| 2,821,260 | Shaw | Apr. 22, 1958 |
| 2,880,511 | Steinwachs | Apr. 7, 1959 |